(12) United States Patent
Aledavood

(10) Patent No.: US 8,776,761 B2
(45) Date of Patent: Jul. 15, 2014

(54) INTERNAL COMBUSTION ENGINE WITH HIGH EFFICIENCY

(76) Inventor: Seyed Meisam Aledavood, Tehran (IR)

( * ) Notice: Subject to any disclaimer, the term of this patent is extended or adjusted under 35 U.S.C. 154(b) by 319 days.

(21) Appl. No.: 13/288,033

(22) Filed: Nov. 3, 2011

(65) Prior Publication Data

US 2012/0067326 A1    Mar. 22, 2012

(51) Int. Cl.
*F02B 7/00* (2006.01)
*F02G 5/00* (2006.01)
*F02B 75/24* (2006.01)

(52) U.S. Cl.
USPC ......... 123/299; 123/431; 123/53.3; 123/55.2; 123/55.7; 123/556

(58) Field of Classification Search
USPC .............. 123/53.3, 55.2, 55.7, 299, 300, 431, 123/198 A, 575, 1 A, 556
See application file for complete search history.

(56) References Cited

U.S. PATENT DOCUMENTS

| | | | | | |
|---|---|---|---|---|---|
| 2,225,115 | A | * | 12/1940 | Hubbard | 417/273 |
| 2,366,186 | A | * | 1/1945 | Freeman | 417/514 |
| 3,400,702 | A | * | 9/1968 | Watkins | 123/198 F |
| 4,026,252 | A | * | 5/1977 | Wrin | 123/54.2 |
| 5,259,256 | A | * | 11/1993 | Brackett | 74/49 |
| 5,862,781 | A | * | 1/1999 | Rossle | 123/55.7 |
| 6,250,279 | B1 | * | 6/2001 | Zack | 123/241 |
| 7,444,998 | B2 | * | 11/2008 | Yatsenko et al. | 123/536 |
| 8,065,991 | B2 | * | 11/2011 | Kuroki et al. | 123/568.12 |
| 8,276,572 | B2 | * | 10/2012 | Kuroki et al. | 123/568.12 |

* cited by examiner

*Primary Examiner* — Hai Huynh
(74) *Attorney, Agent, or Firm* — Barry Choobin; Patent360 LLC

(57) ABSTRACT

An internal combustion engine that is structurally similar to a four-stroke engine. The engine comprises at least one cylinder unit, in turn, comprising a cylinder, a piston head that reciprocates within the cylinder, a combustion chamber defined between the cylinder and the front of the piston head, a fuel injector, an oxygen injector, and an exhaust port. The IC engine further comprises a piston rod, one end of which is connected to the piston head and the other end to the crankshaft. The combustion within the combustion chamber is initiated upon the injection of the fuel and the oxygen into the combustion chamber when the piston is at the top dead center. The spent gases are expelled through the exhaust port as the piston returns to the top dead center.

13 Claims, 5 Drawing Sheets

INTERNAL COMBUSTION ENGINE WITH HIGH EFFICIENCY

FIELD OF THE INVENTION

The present invention relates to Internal Combustion (IC) engines.

BACKGROUND OF THE INVENTION

No significant changes have been witnessed in the fuel efficiency of IC engines over the past 100 years despite immense efforts been made regarding the same. A modern IC engine, especially a commonly used four-stroke engine, has 25% to 45% fuel conversion efficiency. This means, only that percentage of the energy in the consumed fuel is converted into mechanical power while the rest of it, which amounts to a staggering 55% to 75%, is lost through friction and heat. One approach for improving the fuel efficiency of an IC engine would be to work out a better fuel and oxygen combination so as to increase Engine efficiency. This approach might also help alleviating air pollution caused by the hazardous exhaust gases that are usually discharged from the IC engines. Another approach would be to make use of the heat of the exhaust gases and thereby the heat attached thereto, which is otherwise wasted. Yet another approach would be to make effective structural changes around the IC engines. More particularly, the possibility of reduction of the number of piston movements per a power stroke couldn't be completely ruled out.

SUMMARY OF THE INVENTION

It is an object of the present invention to provide an IC engine, which produces a power stroke per the number of strokes, which are more than that of a conventional four-stroke engine.

It is another object of the present invention to provide an IC engine that utilizes the exhaust gases, and the heat thereof, which are otherwise wasted.

It is yet another object of the present invention to provide an IC engine that minimizes hazardous fuel emissions and thereby is relatively eco-friendly.

It is still yet another objective of the present invention to provide an IC engine that employs a better combination of fuel and oxygen so as to ensure a relatively clean and more efficient combustion.

It should also be understood that many other advantages and alternatives for practicing the invention will become apparent from the following detailed description of the preferred embodiments and the appended drawings.

BRIEF DESCRIPTIONS OF THE DRAWINGS

FIGURES—REFERENCE NUMERALS

10 . . . Internal Combustion (IC) Engine
12 . . . Crankshaft
14 . . . Piston Rod
16 . . . Cylinder Unit
18 . . . Piston Head
20 . . . Exhaust Port
22 . . . Fuel Injector
24 . . . Oxygen Injector
26 . . . Combustion Chamber
28 . . . Fuel Storage Tank
30 . . . Oxygen Storage Tank
32 . . . Heat Exchanger
34 . . . Common Piston Rod

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention is an Internal Combustion (IC) engine which is structurally similar to a four-stroke engine (aka four-cycle engine) but completes a combustion cycle within two sweeps of the piston or one revolution of the crankshaft. Therefore, the IC engine of the present invention is in fact an engine. Apart from the structural changes, another factor that has contributed the design of the IC engine is the choice of fuel and oxygen used for combustion.

Figure 1:
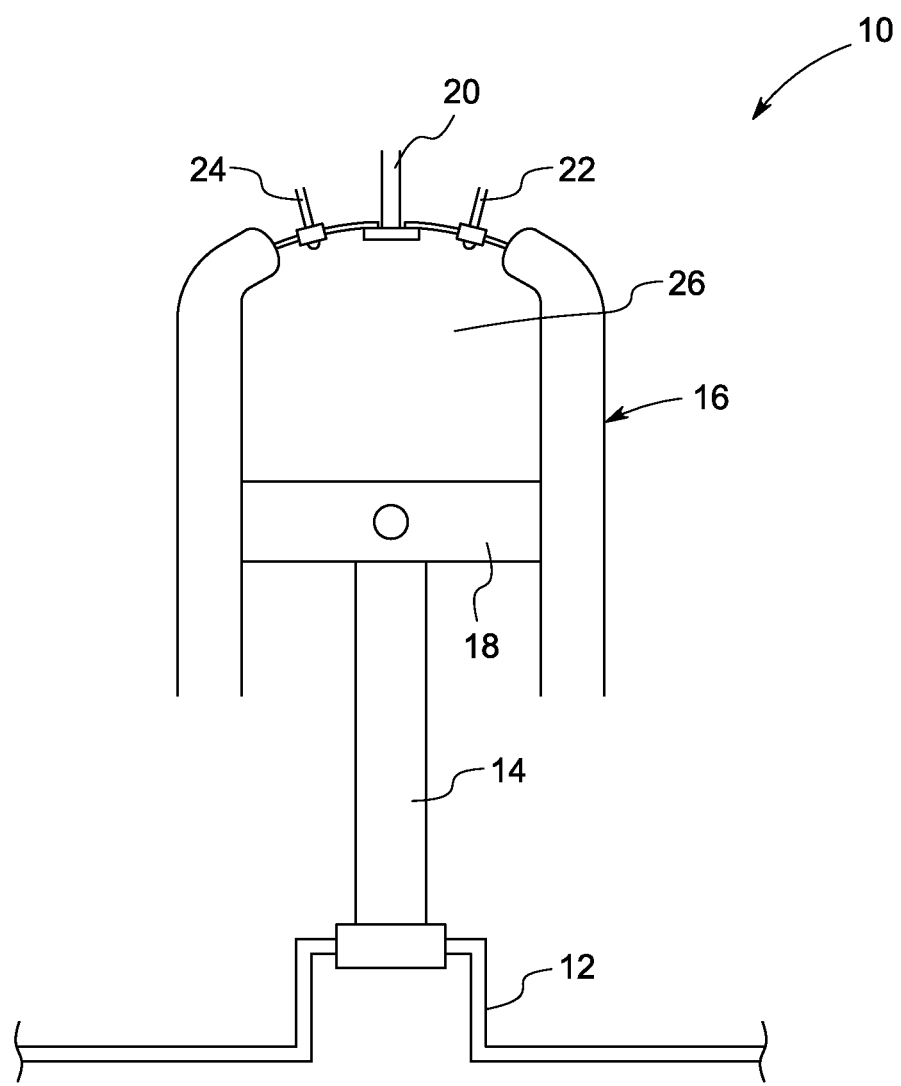
FIG. 1 illustrates the IC engine of the preferred embodiment of the present invention.
Figure 2:
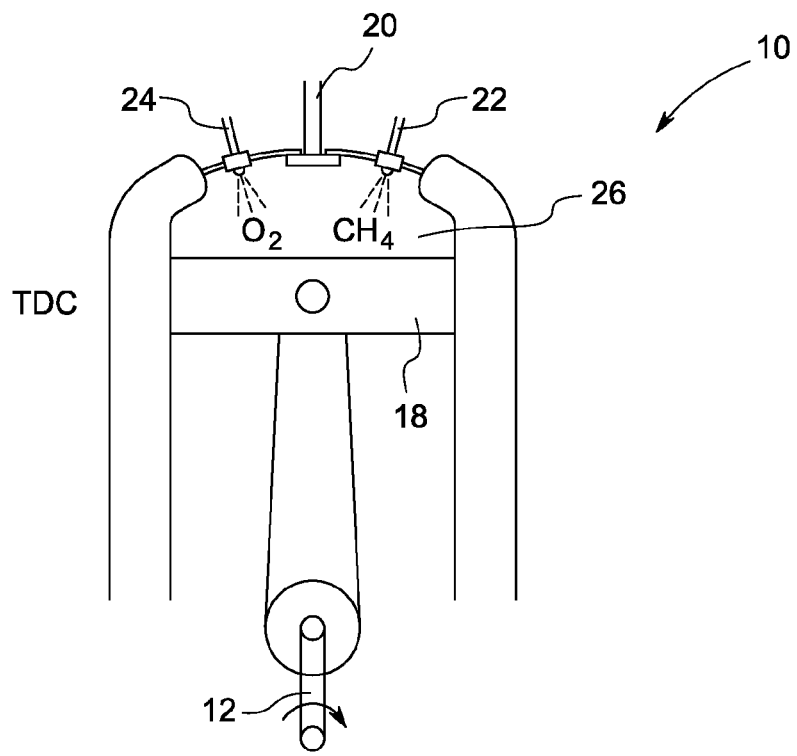
FIGS. 2 through 5 illustrate various stages of the combustion cycle of the IC engine of the present invention.

Referring to FIG. 1, a preferred embodiment of the IC engine 10 comprises a crankshaft 12, a piston rod 14, and a cylinder unit 16, which in turn comprises a cylinder, a piston head 18, and an exhaust port 20. The components of the IC engine 10 are associated with each other in the same manner they are associated in a conventional four-stroke engine. However, instead of an intake port that is commonly found in a conventional IC engine, the IC engine 10 of the present invention employs a fuel injector 22 and an oxygen injector 24 for injecting a fuel and an oxygen respectively into the combustion chamber 26 defined between the front of the piston head 18 and the cylinder. The components of the IC engine 10 are preferably made of ceramic. In the IC engine 10, the combustion process is continuous till the end of injections with the fuel and oxygen injections.

One of the gases including Compressed Natural Gas (CNG), Liquefied Petroleum Gas (LPG), Liquefied Natural Gas (LNG), and Hydrogen gas is used as fuel wherein, CNG ($CH_4$) is preferable. It is a well-known fact that generally only 20% of the air received within the combustion chamber of an IC engine contains oxygen. The other gases that compose the air not only absorb the heat and do not contribute to or participate in the combustion, but cause harmful greenhouse effects when they react with sunlight and moisture upon discharge. Keeping this fact in mind, oxygen ($O_2$) is used as the oxygen so as to ensure a 'cleaner' combustion and complete combustion. The cleaner combustion ensured by the usage of oxygen and the fact that the IC engine is an engine enables generation of higher power from the IC engine, which is of substantially smaller in size compared to conventional four-stroke engines.

Figure 3:
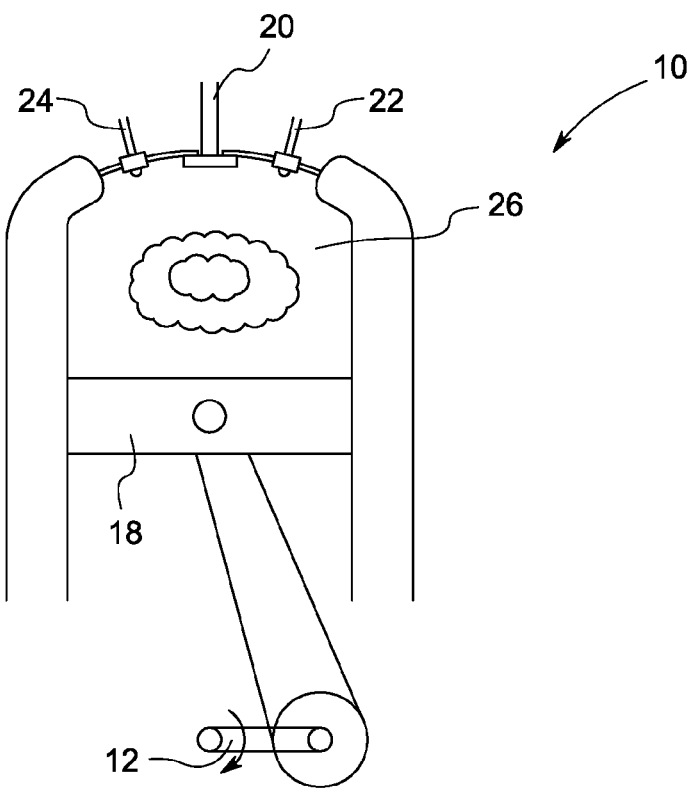
Figure 4:
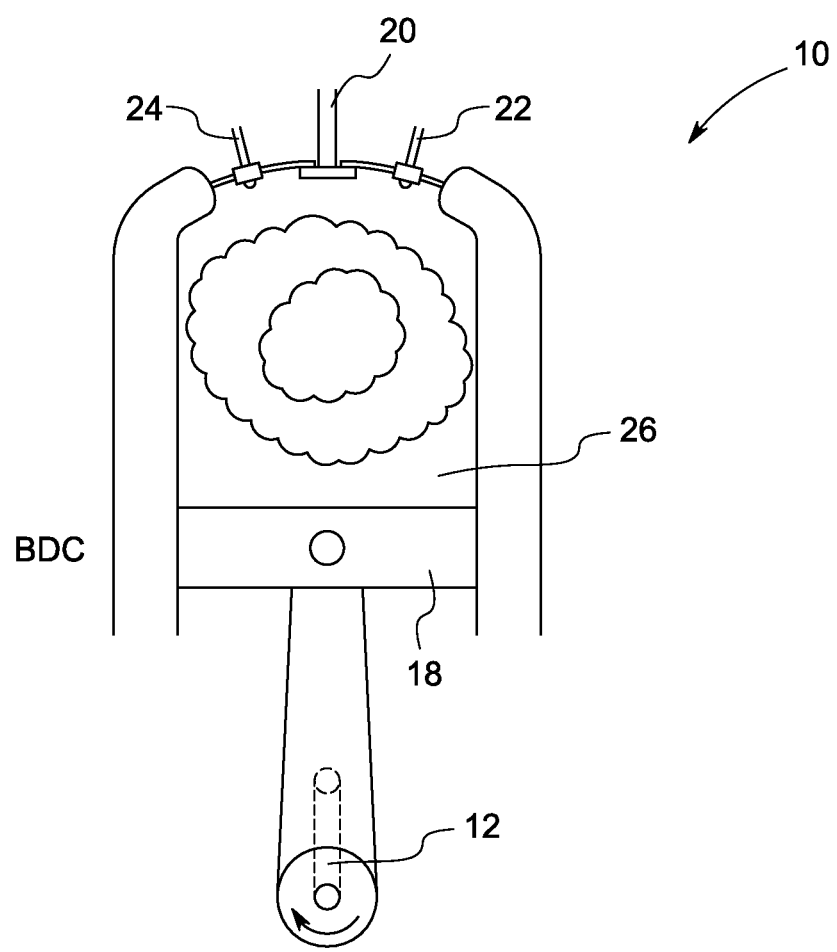
Figure 5:
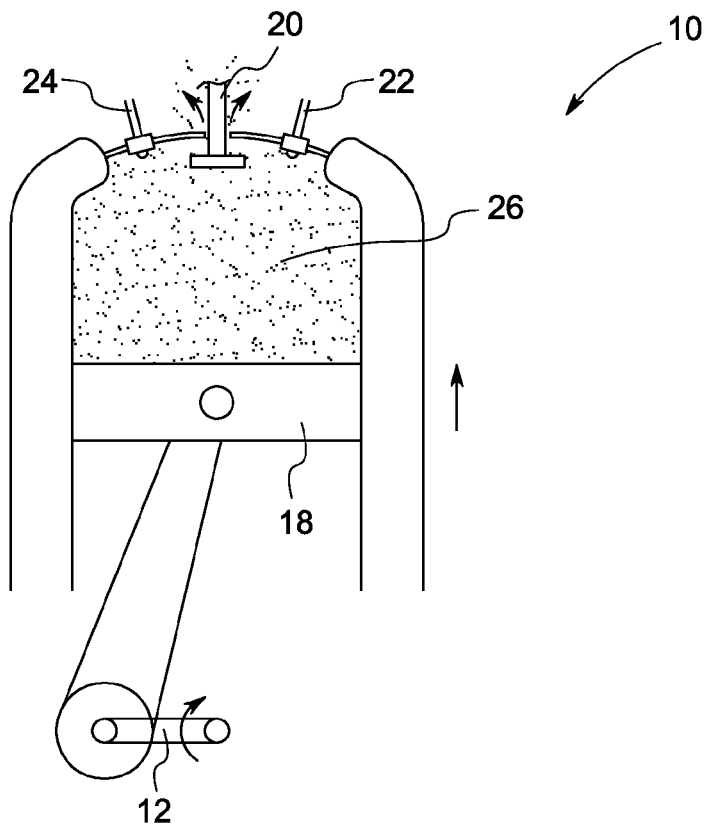

Referring to FIGS. 2 through 5, the IC engine 10 is initiated with the reception of substantially hot and highly-pressurized fuel and oxygen gases into the combustion chamber 26 via their respective injectors 22 and 24 simultaneously when the piston head 18 is at the top dead center (TDC). Once the fuel and oxygen are injected into the combustion chamber 26, the combustion is initiated as a result of a mere collision between the highly-pressurized gaseous particles of the fuel and oxygen and hence the earlier mention: the IC engine is not a compression-ignition engine either. The impact of the combustion pushes the piston head 18 towards the bottom dead center (BDC) only to be returned to the top dead center owing to the impartation of linear motion by the torque of the crankshaft 12 as seen in FIGS. 3 through 5. As the piston head 18 returns to the top dead center, the exhaust port 20 opens up forcing the spent gases out of the combustion chamber 26 as seen in FIG. 5. Once the piston head 18 reaches the top dead center, the exhaust port 20 closes and another round combustion is initiated with the injection of the fuel and oxygen as seen in FIG. 2 again.

Figure 6:
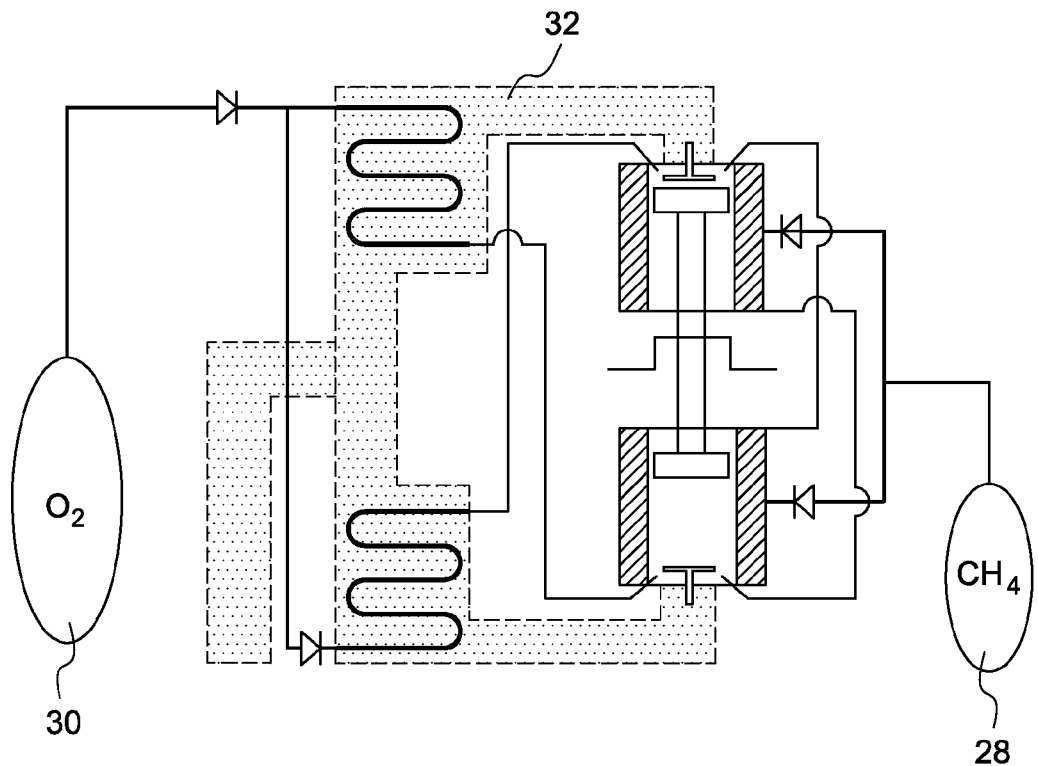
FIG. 6 illustrates the association between the IC engine, the fuel tank, the oxygen tank, and the heat exchanger.

Referring to FIG. 6, the fuel and oxygen are stored in fuel and oxygen storage tanks 28 and 30 respectively in a liquid state. A heat exchanger 32 is used for elevating the temperature, and thereby the pressure of oxygen, by recirculating the exhaust gases therethrough. While exhaust gases are utilized for increasing the temperature of oxygen, the temperature, and thereby the pressure of the fuel is elevated by having the fuel be in indirect contact with the cylinder wall. In other words, the wall of the cylinder acts as a means for transferring the heat to the fuel and cooling the engine. High pressure transmission pipes are employed for carrying oxygen and the fuel from their respective storage tanks 28 and 30 to the combustion chamber via non-return valves or one-way valves.

In one embodiment, in addition to the storage tanks discussed above, intermediate tanks are employed for separately receiving the amount of the fuel and oxygen that is to be supplied to the combustion chamber from the respective storage tanks The intermediate tanks are heated by bringing the exhaust gases or another heat source into contact therewith following which, the contents of the intermediate tanks are injected into the combustion chamber via high pressure transmission pipes.

The following equation represents the chemical reaction between the fuel and the oxygen in the combustion chamber:

$$CH_4 + 2O_2 \rightarrow CO_2 + 2H_2O$$

Figure 7:
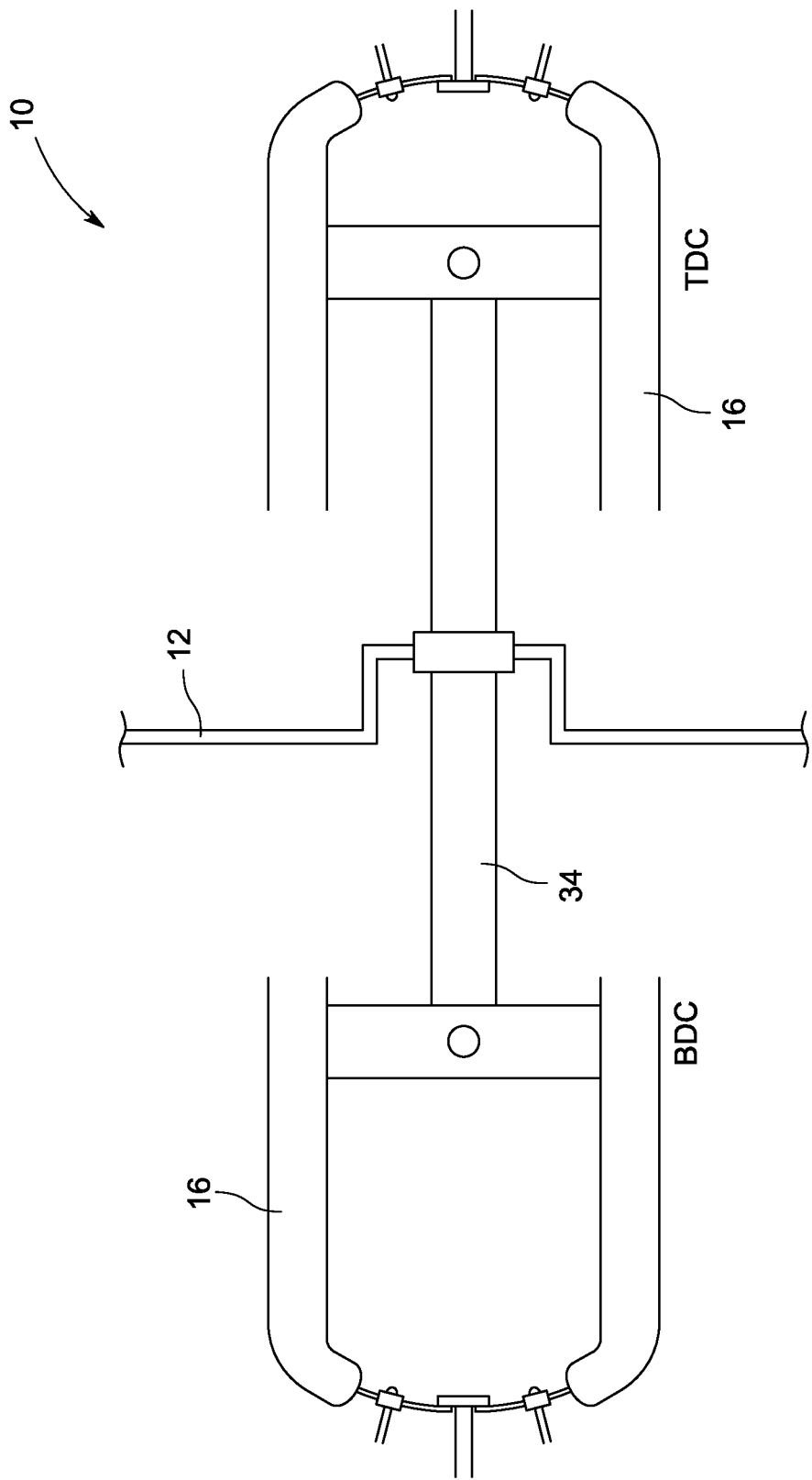
FIG. 7 illustrates another embodiment of present invention among others, which is a single-stroke IC engine.

Referring to FIG. 7, in one embodiment, the IC engine 10 comprises a pair of cylinder units 16, wherein the components of each cylinder unit 16 comprise a cylinder, a piston head, a fuel injector, an oxygen injector, and an exhaust port. The components are assembled the same way they are assembled in the IC engine of the preferred embodiment. The IC engine 10 of this embodiment further comprises a common piston rod 34, and a crankshaft 12 coupled to the common piston rod 34 centrally whereby, the cylinder units 16 are disposed on either side of the crankshaft 12 resembling a boxer twin as shown in the figure. The common piston rod 34 connects the rear of the piston heads of either cylinder unit 16 such that, when one piston head moves towards top dead center, the other heads towards the bottom dead center. This arrangement reduces the two strokes per combustion to one stroke. In other words, a power stroke is produced for every half a revolution of the crankshaft 12. Further, in this embodiment, the heat exchanger is arranged such that, the exhaust gases discharged from one cylinder unit 16 are used for the imparting heat thereof to the amount of oxygen that is to be injected into the combustion chamber of the other cylinder unit 16.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims. Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall therebetween.

What is claimed is:
1. An internal combustion engine comprising:
  (a) at least one cylinder unit comprising:
    (i) a cylinder;
    (ii) a piston head that reciprocates within the cylinder, a combustion chamber defined between the cylinder and a front of the piston head;
    (iii) a means for injecting a fuel into the combustion chamber;
    (iv) a means for injecting an oxidizer into the combustion chamber; and
    (v) an exhaust port;
  (b) a piston rod, one end of which is coupled to a rear of the piston head; and
  (c) a crankshaft coupled to the piston rod whereby a linear reciprocating movement of the piston head is translated into rotation
  (d) a pair of heat exchangers wherein each of the heat exchangers is designed for elevating a temperature of the oxidizer entering the combustion chamber by utilizing a temperature of the exhaust gases expelled from another combustion chamber;
  (e) a plurality of high pressure transmission pipes for carrying oxygen and fuel from a respective storage tank to the combustion chamber; and
    wherein the at least one cylinder unit comprises a pair of cylinder units, wherein the pair of cylinder units are a first cylinder unit and a second cylinder unit, and wherein the second cylinder unit is connected to an other end of the piston rod at the rear of the piston head thereof and wherein the first and second cylinder units are disposed on either side of the crankshaft, and wherein combustion within the combustion chamber is initiated upon the injection of the pressurized fuel and the oxidizer into the combustion chamber when the piston is at the top dead center, the exhaust gases resulted from the combustion are expelled through the exhaust port as the piston returns to the top dead center.

2. The engine of claim 1, wherein as the piston head of the first cylinder unit moves towards the top dead center, the piston head of the second cylinder moves towards the bottom dead center.

3. The engine of claim 1, wherein the crankshaft is coupled to the piston rod centrally.

4. The engine of claim 1, wherein the temperature of the fuel and the oxidizer are elevated prior the injection thereof into the combustion chambers, whereby the fuel and the oxidizer enter into the combustion chamber as gases that are pressurized enough to initiate combustion upon contact thereof.

5. The engine of claim 1, wherein the temperature of the fuel entering each combustion chamber is elevated by being in indirect contact with the wall of the cylinder.

6. The engine of claim 1, wherein the fuel and the oxidizer are stored within fuel and oxidizer storage tanks respectively in liquid state.

7. The engine of claim 1, wherein the oxidizer comprises oxygen.

8. The engine of claim 1, wherein the fuel comprises Compressed Natural Gas.

9. The engine of claim 1, wherein the fuel comprises Liquid Petroleum Gas.

10. The engine of claim 1, wherein the temperature of the fuel and the oxidizer are elevated prior the injection thereof into the combustion chamber, whereby the fuel and the oxidizer enter the combustion chamber as gases that are pressurized enough to initiate combustion upon contact thereof.

11. The engine of claim 10 further comprises at least one heat exchanger for elevating the temperature of the oxidizer entering a combustion chamber by utilizing the temperature of the exhaust gases.

12. The engine of claim 10, wherein the temperature of the fuel entering each combustion chamber is elevated by being in indirect contact with the wall of the cylinder.

13. An internal combustion engine comprising:
 (a) first and second cylinder units, each comprising:
  (i) a cylinder;
  (ii) a piston head that reciprocates within the cylinder, a combustion chamber defined between the cylinder and the front of the piston head;
  (iii) a means for injecting a fuel into the combustion chamber;
  (iv) a means for injecting oxygen into the combustion chamber; and
  (v) an exhaust port;
 (b) a piston rod, either end of which is connected to rear of the piston heads of the first and second cylinder units; and
 (c) a crankshaft coupled to the piston rod centrally whereby the linear reciprocating movement of the piston heads is translated into rotation,
 (d) at least one heat exchanger for elevating the temperature of the oxidizer entering a combustion chamber by utilizing the temperature of the exhaust gases, and wherein the temperature of the fuel entering each combustion chamber is elevated by being in indirect contact with the wall of the cylinder;
 (e) a plurality of high pressure transmission pipes for carrying oxygen and fuel from a respective storage tank to the combustion chamber; and
  wherein the at least one cylinder unit comprises a pair of cylinder units, wherein the pair of cylinder units are a first cylinder unit and a second cylinder unit, and wherein the second cylinder unit is connected to another end of the piston rod at the rear of the piston head thereof and wherein the first and second cylinder units are disposed on either side of the crankshaft, and wherein combustion within the combustion chamber of a cylinder unit is initiated upon the injection of the pressurized fuel and oxygen into the combustion chamber when the piston is at the top dead center, the exhaust gases resulted from the combustion are expelled through the exhaust port as the piston returns to the top dead center.

* * * * *